Feb. 24, 1931.                R. C. BAKER                1,793,894
                    FORMATION DIRECTION INDICATOR
                       Filed April 27, 1927
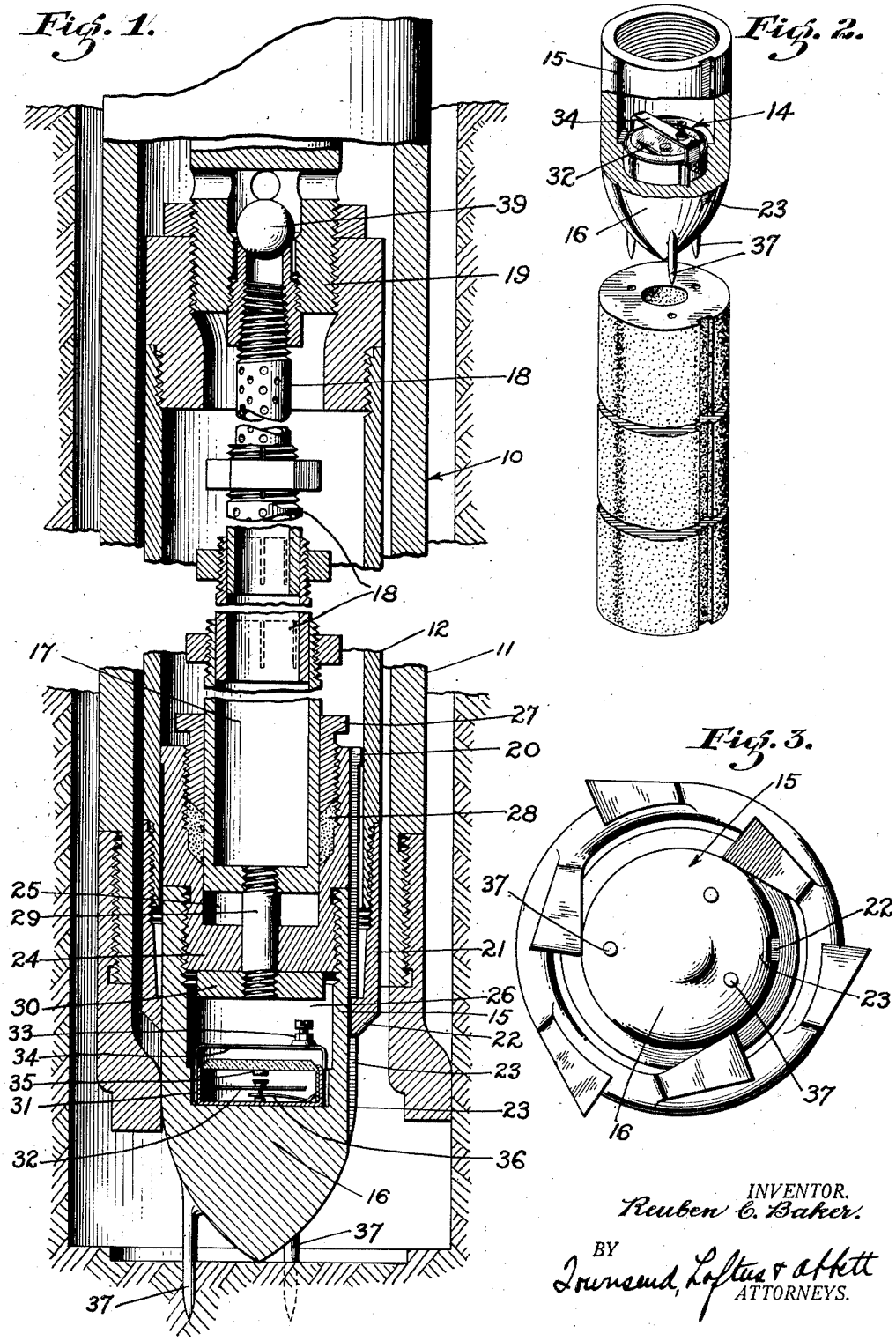
INVENTOR.
Reuben C. Baker.
BY
Townsend, Loftus & Abbott
ATTORNEYS.

Patented Feb. 24, 1931

1,793,894

UNITED STATES PATENT OFFICE

REUBEN C. BAKER, OF COALINGA, CALIFORNIA, ASSIGNOR TO BAKER OIL TOOLS, INC., OF HUNTINGTON PARK, CALIFORNIA, A CORPORATION OF CALIFORNIA

FORMATION DIRECTION INDICATOR

Application filed April 27, 1927. Serial No. 186,910.

This invention relates to the art of mineral oil mining and particularly pertains to that step in this art which is the determining by geological structure, formations favorable to the accumulation of mineral oil deposits.

Oil fields are usually located by prospecting for geological structure favorable to the accumulation of such mineral deposit. Therefore, in sinking an oil well, cores or samples of the strata penetrated are taken at frequent intervals to permit the formation being penetrated to be analyzed for determining whether or not its geological structure indicates the presence of oil deposits. Certain geological formations such as an anticline indicate the probability of the presence of an oil deposit. An anticline is an arch or fold in the stratified formation of the earth's crust, the sides of which incline downwardly from the crest. The sides of the anticline incline at an angle to the plane of the horizon and this inclination is termed the "dip" of the strata.

Hitherto, core taking devices have been used for taking cores which disclose the fact that the drill is penetrating a dip or sloping strata, but prior to my invention and discovery, no means have been discovered for determining, by the taking of cores, the direction relative to the points of the compass that the strata slope. Such information is extremely important as it enables the approximate location of the crest of the anticline to be determined.

It is the principal object of the present invention to provide a method and apparatus enabling those engaged in mineral oil mining to exactly determine, by taking cores or samples of the formation penetrated, the direction that the strata penetrated slope.

In carrying out this object into practice I provide a device including a compass, which may be lowered into a well and engaged with the formation sample to be taken. After the needle takes a position coincident in direction with the earth's magnetic field, that is, a north and south direction, the compass needle is locked in position relative to the sample to be taken and the latter is recovered by a tube and elevated to the surface. The direction which the strata slope may then be compared with the compass and definitely determined.

One form of apparatus for carrying out the invention is exemplified in the following description and illustrated by way of example in the accompanying drawings, wherein:

Fig. 1 is an enlarged view in vertical section through a core taking device disclosing an apparatus embodying my present invention operatively associated therewith.

Fig. 2 is a schematic perspective view showing the formation sample and the direction indicator disposed in relation thereto to permit the direction which the strata slope to be determined.

Fig. 3 is a bottom view of the core taking device showing the lower end of the direction indicator.

Referring more particularly to the accompanying drawings 10 indicates a core taking barrel which includes an outer drill barrel 11 and an inner core tube 12 mounted concentrically within the drill barrel 11. The drill barrel is capable of rotation relative to the core tube so that in operation the core tube does not rotate, while it is being forced over a core.

Slidably disposed within the core tube is a direction indicator indicated by the numeral 14. This indicator comprises a hollow cylindrical casing 15 having a closed lower end 16. At its upper end the casing 15 is connected with a telescoping connector tube 17 which comprises a series of telescopically connected sections 18. The upper end of the telescoping tube 17 is secured to the head member 19 of the core tube so that the casing 15 will be suspended within the core tube.

The casing 15 cannot pass through the lower end of the core tube due to the fact that it is provided with an annular shoulder 20 at its upper end which will not pass through the trimmer shoe 21 at the lower end of the core tube.

At the lower end of this trimmer shoe it is provided with an inwardly projecting cutting tooth 22 which engages a longitudinal keyway 23 formed in the periphery of the casing 15. This keyway 23 serves two purposes, one of which is to prevent relative rotation between the core tube and the casing 15, and to form a longitudinal groove in the core as it is forced within the core tube. The purpose of this will be hereinafter described.

It will be noticed from Fig. 1 that the casing 15 is formed in two threadedly connected sections and at the point of connections a transverse partition wall 24 is formed dividing the interior of the casing into an upper compartment 25 and a lower compartment 26.

The lower end of the telescoping connector tube 17 is slidably disposed in the upper compartment 25. To form a fluid tight joint between the end of the connector tube 17 and the interior of the casing 15 a packing gland 27 is provided which engages the periphery of the connector tube 17 and is threaded within the upper end of the casing 15, packing 28 being interposed between the gland 27 and a peripheral recess in the casing 15. The lower end of the connector tube 17 is closed and a stud 29 is secured thereto and projects downwardly through the partition wall 24. Within the compartment 26 a plunger head 30 is connected with this stud 29 so that vertical reciprocation of the connector tube 17 relative to the casing 15 will be imparted to this plunger 30.

Secured within the bottom of the compartment 26 beneath the plunger 30 is a compass structure 31 including the usual needle 32. Operatively associated with this needle but normally uninterfering with its operation is a tripping device 33 including a lever 34 disposed above the needle. When this lever 34 is depressed, it automatically forces the needle upwardly into contact with a friction pad 35 secured at the underside of the glass cover of the compass, latching the needle in position. This method of latching the needle is only one of a great number of ways that this can be accomplished, and while I have shown this particular construction, it is to be understood that any method of latching the needle may be resorted to.

It will suffice to say that when the plunger 30 engages the lever 34, this motion is transferred into upward swinging movement of a lever 36 within the compass case which forces the needle 32 upwardly into contact with the friction pad 35, latching it in position. It is intended that the casing 15 be engaged with the core or sample to be taken and when the needle has assumed a position coincident in direction with the earth's magnetic field, that is, a north and south direction, the plunger 30 is forced downwardly into engagement with the lever 34, latching the needle in position. The movement of the plunger 30 is limited by the distance between the lower end of the connector tube 17 and the partition wall 24, allowing the plunger 30 only sufficient downward movement to actuate the lever 34.

In operation of the device, the indicator structure is assembled within the core tube of a rotary or percussion type of core barrel and the latter is lowered within the well. The lower end of the casing 15 projects beyond the end of the core barrel and is fitted with three sharpened prongs 37 which engage the formation encountered. The core barrel and the direction indicator structure is lowered into the well until these prongs 37 firmly engage the formation. The entire structure is then allowed to remain suspended within the well until the needle 32 of the compass comes to rest. When the needle comes to rest the core barrel is lowered the remaining distance to engage the formation.

This lowering movement causes the telescopic connector tube 17 to move relative to the casing 15, engaging the plunger 30 with the lever 34 and latching the compass needle into place as previously described. It is believed obvious that the casing 15 will remain stationary during this period due to the fact that it is already engaged with the formation. There is sufficient frictional resistance between the joints of the connector tube 17 to cause the lower end thereof to move downwardly relative to the casing 15 and actuate the plunger 30.

The drill barrel is then actuated by revolving it relative to the core tube 12 causing a core to be cut away and forced upwardly within the core tube. The casing 15 being engaged with the top of the core is moved upwardly within the core tube as the core is cut and inserted into the tube.

The keyed connection formed by the cutting tooth 22 and the keyway 23 in the casing 15 prevents relative rotation between the core tube and the casing 15 while the core is being taken. As the core enters the core tube 12 the cutting tooth 22 will form a longitudinal groove therein so that should portions of the core be disconnected during their removal from the core tube they may be readily aligned.

It is seen that as the core is forced upwardly within the core tube the casing 15 will be likewise forced toward the upper end thereof. This is permitted by reason that the connector tube 17 is formed with telescopically connected sections which telescope as the casing 15 moves toward the upper end of the core tube. It may be preferred that the connector tube 17 be perforated so that any fluid entrapped within the core tube may escape outwardly through a check valve structure 39 at the upper end of the core tube.

After a sufficient length of core has been taken the entire device is elevated to the surface. During this elevating movement the core may be held within the core barrel by a core retaining device of any desired construction. A core retainer is not essential to the operation of the core barrel as a core will remain in the barrel without the use of a core retainer and therefore such a device forms no part of the present invention it is not here shown. It may, however, be a device such as disclosed in my United States Letters Patent entitled "Core retainer for core barrels", No. 1,655,644, issued January 10, 1928, and "Rotary core barrel", No. 1,720,877, issued July 16, 1929. The core barrel structure disclosed in this application is described and claimed in this latter application.

After the entire structure has been elevated to the surface the drilling shoe at the lower end of the drill barrel 11 is removed and the entire core tube is withdrawn from the drill barrel. The trimmer shoe of the core tube is then also removed and the tube disconnected from its head member, so that the core may be properly extracted from the core tube.

After the core has been extracted its disconnected sections are properly relatively positioned by means of the groove cut therein by the tooth 22, as the core was forced into the core tube. The compass may then be positioned relative to the core in two manners, one of which is to align the keyway 23 in the casing 15 with the groove cut in the core. The other manner is engaging the tongs 37 of the casing 15 with the holes formed thereby in the upper end of the core. I prefer that the spacing between these three tongs 37 be different so that they will fit into the openings made thereby in the end of the core in only one position, permitting the compass to be disposed relative to the core at the surface of the well exactly in the same position as it was disposed relative thereto at the bottom of the well prior to the taking of the sample.

During all this time the needle of the compass has remained latched in north and south position. So that access to the compass may be had the lower portion of the casing 15 is detached from the upper portion exposing the compass as disclosed in Fig. 2. The direction that the strata slope in the sample may then be compared with the location of the North Pole and its direction with relation thereto determined.

It is manifest from the foregoing that I have provided a comparatively simple device enabling those engaged in mineral oil mining to accurately determine the slope of stratified formations recovered from a well with relation to the points of the compass.

From the foregoing it is obvious that the essentials of my invention consist in arranging a magnetic needle carrying device in the core tube, lowering the core tube and magnetic needle into the bore, and orientating and attaching the magnetic needle which is a direction marker to the formation, and then taking a core including said magnetic needle.

While I have shown the preferred form of my invention, it is to be understood that various embodiments thereof may be made by those skilled in the art without departing from the spirit of the invention or discovery as defined within the scope of the appended claims.

Having thus described my invention, what I claim and desire to secure by Letters Patent is:

1. A device of the character described comprising in combination with a core barrel having an exterior drill barrel and an interior core tube, of a casing slidably mounted within the core tube, a magnetic needle within the casing, a telescopic connection between the casing and the upper end of the core tube whereby the casing may vertically reciprocate within the core tube, spaced prongs projecting downwardly from the lower end of the casing for penetration into the end of a core to be taken and remaining relatively fixed with relation thereto, the spacing between said prongs being unequal, means operative by certain relative movement between the core tube and the casing for latching the needle in an indicating position whereby it may be relatively fixed to the core.

2. In combination with a core tube adapted to recover a core in a well, a casing mounted within the core tube and telescopically connected to its upper end, a compass including a magnetic needle mounted within said casing, means on the lower end of said casing whereby it may be engaged with and relatively fixed to the upper end of the core to be taken, said magnetic needle being normally operative in the well whereby it will assume an indicating position indicating the direction of the earth's magnetism, means for latching said needle in said indicating position after it has been lowered in the well whereby when said core and casing have been elevated to the surface the direction of slope of the strata of the core may be compared with the needle and its direction determined.

3. In combination with a core tube adapted to recover a core in a well, a casing arranged in the core tube and adapted to move longitudinally therein, a telescopic connection between said casing and the upper end of said core tube, a magnetic needle arranged within said casing, means on said casing capable of relatively fixing the same to a core when the core tube is lowered in a well, said telescopic connection enabling the casing to move upwardly in the core tube as the core tube advances over a core, means for stationarily fixing said needle subsequent to engaging the casing with the core.

4. In combination with a core taking device including a core barrel, of a casing arranged within the core barrel and movable longitudinally thereof, said casing including a magnetic needle, means on the casing enabling it to be relatively fixed to a core to be taken when the core taking device is lowered in a well bore, means for latching said needle in an indicating position subsequently to the engaging of the casing with the core.

REUBEN C. BAKER.